(12) United States Patent
Kalb et al.

(10) Patent No.: US 12,712,416 B2
(45) Date of Patent: Aug. 18, 2026

(54) DRIVE DEVICE, IN PARTICULAR ADJUSTMENT DRIVE, IN A MOTOR VEHICLE

(71) Applicant: Brose Fahrzeugteile SE & Co. Kommanditgesellschaft, Bamberg, Bamberg (DE)

(72) Inventors: Roland Kalb, Rossach (DE); Gabriele Lange, Marktrodach (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 208 days.

(21) Appl. No.: 18/581,594

(22) Filed: Feb. 20, 2024

(65) Prior Publication Data

US 2024/0195263 A1 Jun. 13, 2024

Related U.S. Application Data

(63) Continuation of application No. PCT/EP2022/072760, filed on Aug. 15, 2022.

(30) Foreign Application Priority Data

Aug. 17, 2021 (DE) ..................... 10 2021 209 020.6

(51) Int. Cl.
*H02K 7/116* (2006.01)
*E05F 15/697* (2015.01)

(52) U.S. Cl.
CPC .......... *H02K 7/1166* (2013.01); *E05F 15/697* (2015.01); *E05Y 2201/10* (2013.01); *E05Y 2900/55* (2013.01)

(58) Field of Classification Search
CPC ...... H02K 7/1166; H02K 7/14; H02K 11/215; H02K 1/187; E05F 15/697; E05Y 2201/10; E05Y 2900/55
See application file for complete search history.

(56) References Cited

U.S. PATENT DOCUMENTS 11,828,098 B2 11/2023 Lange
2002/0047397 A1 4/2002 Osawa et al.
(Continued)

FOREIGN PATENT DOCUMENTS

DE 1276303 A 8/1968
DE 102015120247 A1 5/2017
(Continued)

OTHER PUBLICATIONS

JP2010093943A English translation (Year: 2025).*
JP2004304877A English translation (Year: 2026).*

*Primary Examiner* — Christopher M Koehler
*Assistant Examiner* — Viswanathan Subramanian
(74) *Attorney, Agent, or Firm* — Laurence A. Greenberg; Werner H. Stemer; Ralph E. Locher

(57) ABSTRACT

A drive device, preferably a window raising mechanism drive, in a motor vehicle, includes a drive housing, in particular a gear mechanism housing, and a brushless electric motor, disposed in the drive housing and having a stator with a stator base member, which is disposed on a housing-secured, tubular stator carrier and is intended for a stator winding, and a rotor with a rotor shaft, which is guided into the drive housing or gear-mechanism housing by the stator carrier. The stator carrier is integrated in one piece in the drive housing or gear-mechanism housing.

6 Claims, 3 Drawing Sheets

(56) References Cited

U.S. PATENT DOCUMENTS

| | | | | |
|---|---|---|---|---|
| 2013/0200742 | A1 * | 8/2013 | Seki ...................... | H02K 15/02 310/195 |
| 2021/0379971 | A1 | 12/2021 | Ramalingesh et al. | |
| 2022/0263395 | A1 | 8/2022 | Bürg | |

FOREIGN PATENT DOCUMENTS

| | | | | |
|---|---|---|---|---|
| DE | 102016216888 | A1 | | 3/2018 |
| DE | 102019112726 | A1 | | 11/2020 |
| DE | 102019128049 | A1 | | 4/2021 |
| JP | 2004304877 | A | * | 10/2004 |
| JP | 2010093943 | A | | 4/2010 |
| WO | 2020173905 | A1 | | 9/2020 |

* cited by examiner 10
9
11
R
A
II
5
6
7
3
II
18
2
1

D
4
3
5
13, 27
18
17
26, 26b
16
14, 15
28
20
25
26, 26a
22
12
8
24
19
21
2
23
1

DRIVE DEVICE, IN PARTICULAR ADJUSTMENT DRIVE, IN A MOTOR VEHICLE

CROSS-REFERENCE TO RELATED APPLICATION

This application is a continuation, under 35 U.S.C. § 120, of copending International Patent Application PCT/EP2022/072760, filed Aug. 15, 2022, which designated the United States; this application also claims the priority, under 35 U.S.C. § 119, of German Patent Application DE 10 2021 209 020.6, filed Aug. 17, 2021; the prior applications are herewith incorporated by reference in their entirety.

FIELD AND BACKGROUND OF THE INVENTION

The invention relates to a drive apparatus, in particular an electromotive adjustment drive, preferably a window raising mechanism drive, of a motor vehicle.

A drive apparatus which, for example, as an electromotive adjustment drive of a motor vehicle, drives an adjustment element between two end positions along an adjustment path, generally includes an electric motor and a gear mechanism which is coupled thereto and which is disposed in a gear mechanism housing. A brushless electric motor can be used for such a drive apparatus, in which the brushless electric motor has a stator having a rotary field winding (stator winding) and a permanently excited rotor having a rotor shaft which is or can be coupled to a gear mechanism.

German Patent Application DE 10 2016 216 888 A1, corresponding to U.S. Pat. No. 11,828,098 B2, discloses a drive apparatus for adjusting a covering element of a motor vehicle, in particular for a window raising device. The drive apparatus includes an output element for adjusting the covering element and a motor unit which has an electric motor having a stator, having a rotor and having a drive shaft which is connected to the rotor and can be rotated about a shaft axis for driving the output element. A drive housing at least partially receives the motor unit, wherein the stator is connected by a bearing element to a fixed housing portion of the drive housing and the bearing element has a bearing opening in which the drive shaft is rotatably supported with respect to the stator. The electric motor can thereby be in the form of an external rotor motor having a centrally internally located fixed stator and a rotor which rotates about it externally. The rotor can therefore be constructed with a comparatively large diameter, which can bring about a favorable torque behavior of the electric motor.

The bearing element which is provided as a separate component and which is referred to below as a stator carrier or stator bushing may, for example, be produced from plastics material and be fixed by pressing, adhesive bonding or welding in the stator (stator base member), on the one hand, and in the drive or the gear mechanism housing. In the drive apparatus the stator carrier functionally performs the connection and production of a rigid connection of the stator or the (stator) base member thereof to the gear mechanism housing and the connection and production of a rigid connection to the stator base member which is, for example, in the form of a lamination bundle.

It would be conceivable to configure the stator carrier as a sintered component or in two pieces as a solid formed or machined metal component and additionally mounted bearing sleeve for the drive shaft or motor shaft. Since at the interfaces with respect to the adjacent components, that is to say, with respect to the stator and the stator base member (stator lamination bundle) thereof, on the one hand, and the drive or gear mechanism housing, on the other hand, press-fits are generally provided, as a result of the component tolerances which may be anticipated, a large range of the required assembly forces is produced. Furthermore, the durability of the press-fit connections is questionable. Furthermore, the provision of the separate bearing element is cost-intensive. In addition, the drive apparatus when a metal bearing element is used has a corresponding additional weight.

SUMMARY OF THE INVENTION

It is accordingly an object of the invention to provide a particularly suitable drive device, in particular an adjustment drive, preferably a suitable window raising mechanism drive, in a motor vehicle, which overcomes the hereinafore-mentioned disadvantages of the heretofore-known devices of this general type. In particular, a cost-effective and weight-reduced drive apparatus having an external rotor motor and with a particularly suitable bearing element which is referred to below as a stator carrier is intended to be set out. Preferably, the stator carrier should be suitable for receiving a bearing for the drive shaft (motor shaft) of the electric motor or the rotor thereof.

With the foregoing and other objects in view there is provided, in accordance with the invention, a drive apparatus, in particular an electromotive adjustment drive, preferably a window raising mechanism drive, of a motor vehicle, having a drive housing and a brushless electric motor which is disposed or can be mounted in the drive housing. The electric motor is in particular an external rotor motor having a stator and having a rotor having a rotor shaft which is or can be coupled to a gear mechanism. The stator has a stator base member which is disposed on a tubular stator carrier that is secured to a housing for a stator winding, and has a rotor having a rotor shaft, wherein the rotor shaft is guided via the stator carrier in the drive housing, in particular in a gear mechanism housing, and the stator carrier is integrated in one piece or integrally in the drive housing.

Advantageous embodiments and further developments are set out in the dependent claims.

The drive apparatus is in particular an electromotive adjustment drive, preferably a window raising mechanism drive, of a motor vehicle. Preferably, a (first) bearing, in particular a plain bearing, for the rotor shaft is received in the stator carrier.

The stator carrier extends with a first carrier portion in the drive or gear mechanism housing and at that location in a housing portion which receives the rotor shaft and which is in particular hollow-cylindrical and is formed thereon, preferably at the inner side. Preferably, the stator carrier is injected as a tubular or bush-like plastics material injection-molded component onto the housing portion, which receives the rotor shaft, of the drive housing. In other words, the stator carrier is formed from the material of the (gear mechanism) housing itself.

In an advantageous embodiment, the stator carrier has an inner diameter which is smaller than the inner diameter of the section of the housing portion which receives the rotor shaft and which is located axially outside the stator carrier.

Advantageously, the stator carrier protrudes with a carrier portion which carries the stator base member into an in particular hollow-cylindrical housing, which receives the stator and the rotor, space of the drive housing.

In an advantageous embodiment, the stator base member is in the form of an in particular punch-bundled lamination bundle. Advantageously, the stator base member is provided with two half-shell-like insulating caps or shells. In a particularly preferred manner, the insulating cap facing the stator carrier has a sleeve-like cap portion which preferably has guiding contours for connection wires of the stator winding and through which the stator carrier which is formed on the housing, in particular formed on the gear mechanism housing, extends.

Other features which are considered as characteristic for the invention are set forth in the appended claims.

Although the invention is illustrated and described herein as embodied in a drive device, in particular an adjustment drive, in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
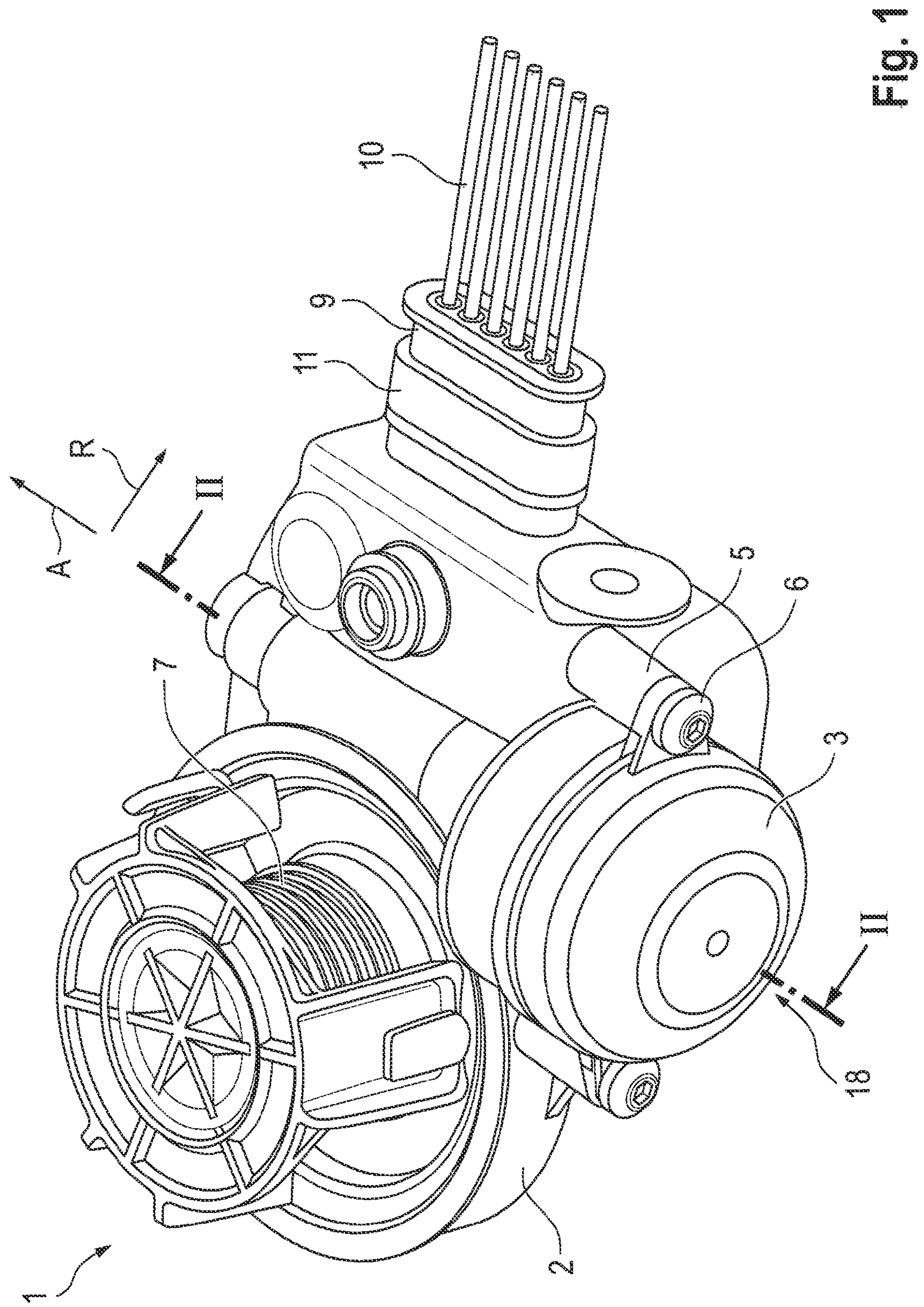
FIG. 1 is a side-perspective view of an electromotive drive apparatus having a drive housing which is composed of a gear mechanism housing and a motor housing and which has an electric motor which is received therein.

Referring now in detail to the figures of the drawings, in which mutually corresponding components are given the same reference numerals, and first, particularly, to FIG. 1 thereof, there is seen an electromotive drive apparatus 1 having a gear mechanism housing 2 and having a motor housing 3 in which an electric motor 4 is inserted. The gear mechanism housing 2 and the motor housing 3 are releasably connected to each other by a flange connection 5 with a drive housing 2, 3 being produced, preferably screwed with flange screws 6. In the exemplary embodiment, the electric motor 4 uses a gear mechanism to drive a cable drum 7 as an output element.

Figure 2:
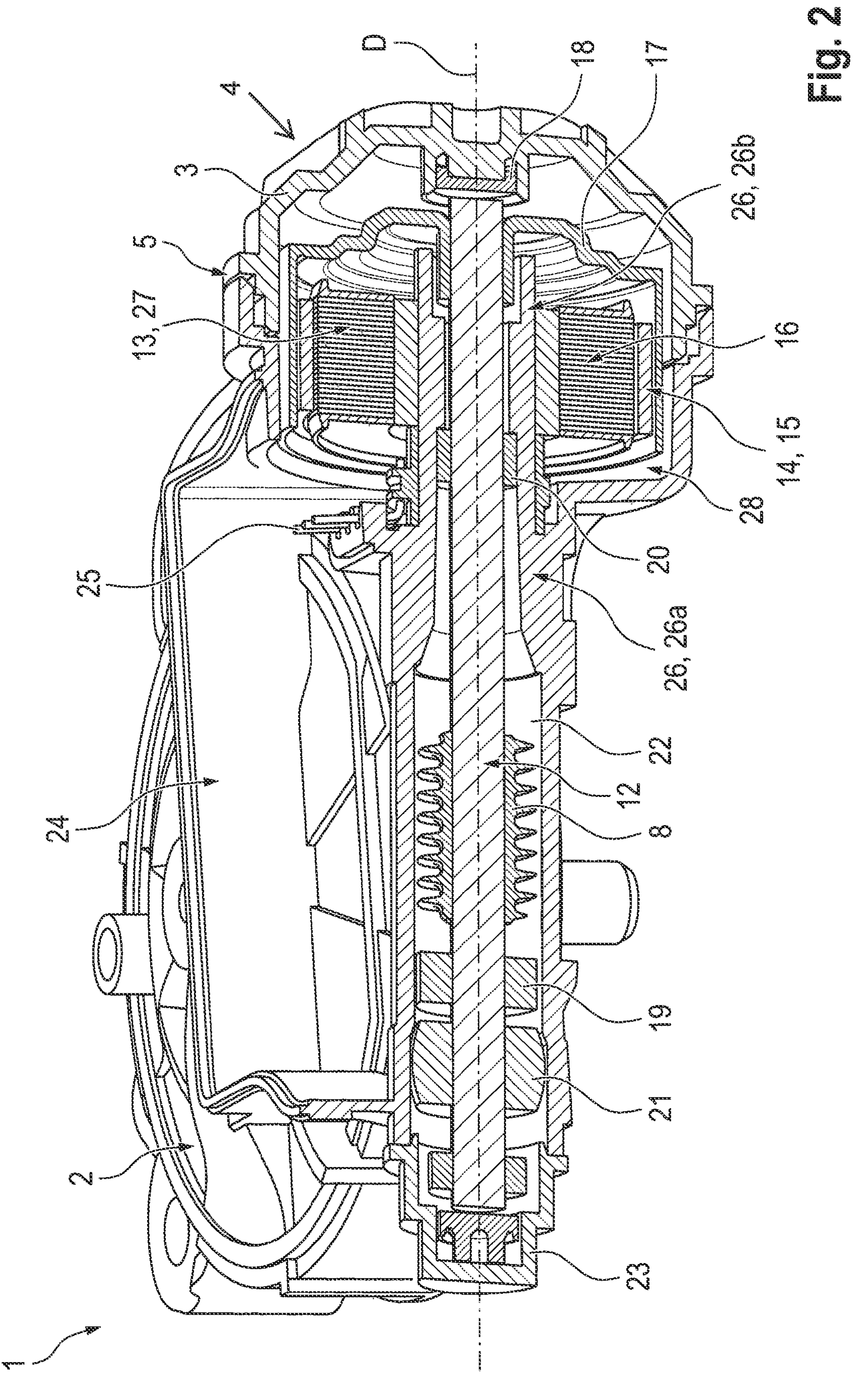
FIG. 2 is a perspective sectional view taken along a line II-II in FIG. 1 of the stator which is placed on a hollow-cylindrical stator carrier that is integrated in one piece in the housing and which has a stator winding and the rotor which is secured to the shaft of the electric motor, that is in the form of an external rotor.

The gear mechanism of the drive apparatus 1 is a 90° redirection gear, in particular a worm gear. The worm wheel thereof which is not visible and which is disposed in the gear mechanism housing 2 and which is coupled to the cable drum 7 for a pulling cable of a window raising mechanism of a motor vehicle, meshes with a worm 8 which is driven by the electric motor 4 (FIG. 2). A connection plug 9 having connection lines 10 for power and voltage supply of the drive apparatus 1 which acts as an adjustment drive of the motor vehicle and for supplying and/or discharging control or sensor signals, is inserted into a connection receiving member 11 at the housing side.

In FIG. 1, an axial direction A and a radial direction R, are indicated by arrows. In addition, in FIG. 2 the rotary axis or shaft axis of a motor or rotor shaft 12, which is illustrated in FIG. 2 with dot-dash lines, is designated D.

The electric motor 4 has a stator 13 which can be seen in FIG. 2 and a rotor 15 which is formed from a permanent magnet 14 and which is secured to the motor shaft 12. The stator 13 carries a stator or rotary field winding 16 which, for example, is formed from a number of individual coils. The permanent magnets 14 of the rotor 15 are disposed in a pot-like housing (rotor housing) 17 at the inner wall. The rotor housing 17 is connected in a rotationally secure manner to the rotor or motor shaft 12 and consequently rotates within the motor housing or housing cover 3 about the stator 13, which is fixed in the gear mechanism housing 2, of the brushless electric motor 4 which is consequently in the form of an external rotor motor. The motor shaft (rotor shaft) 12 is supported in the motor housing 3 which is in the form of a housing cover at a bearing location 18 (FIG. 1) or positioned therein.

A magnetic signal generator (pole wheel) 19 is additionally positioned on the rotor shaft 12 which carries the worm 8 that in the assembly state meshes with the worm gear (not visible) of the gear mechanism in a state secured to the shaft. The magnetic signal generator (pole wheel) 19 cooperates with a magnet sensor (not visible), for example, a Hall sensor, in a contactless manner in order to determine or establish the speed and the rotation direction of the rotor shaft 12, and consequently of the electric motor 4.

At both sides of the worm 8, which is secured to the shaft or at the side of the worm 8 facing axially away from the motor housing or housing cover 3, the motor shaft 12 is supported in at least one additional bearing, preferably at both sides of the worm 8, in an additional bearing 20, 21, for example, in a plain bearing and/or in a roller or ball bearing. At the end of the housing shaft 22 facing away from the motor housing 3, it is accessible via a removable housing cap 23.

Within the gear mechanism housing 2 there is a printed circuit board which is provided with electronic and/or electrical components, of an electronic motor system which is not shown and which is or becomes received in an electronic compartment 24. Along with the electronic motor system or with the printed circuit board, within the electronic compartment 24, phase connection wires 25 of the coils of the rotary field or stator winding 14 of the electric motor 4 are contacted.

The stator 13 is positioned on a hollow-cylindrical stator carrier 26. This stator carrier 26 extends with a first carrier portion **26*a* into the drive or gear mechanism housing 2 and there into the in particular hollow-cylindrical housing portion or shaft 22 which receives the rotor shaft 12. At that location, the stator carrier 26 is formed on the drive housing, that is to say, on the housing portion or shaft 22 of the gear mechanism housing 2, at the inner side in one piece. The stator carrier 26 which is consequently integrated in the housing 2 is injected as a tubular or bush-like plastics material injection-molded component onto the housing portion 22 of the drive housing which receives the rotor shaft 12**.

The inner diameter of the tubular or bush-like stator carrier 26 is smaller than the inner diameter of the portion of the housing portion 22 which receives the rotor shaft 12 and which is located axially outside the stator carrier 26. The stator carrier 26 protrudes with a second carrier portion **26*b*** which carries the stator 13 or the stator base member 27 thereof into a hollow-cylindrical housing space 28, which receives the stator 13 and the rotor 15, of the drive or gear mechanism housing 2.

Figure 3:
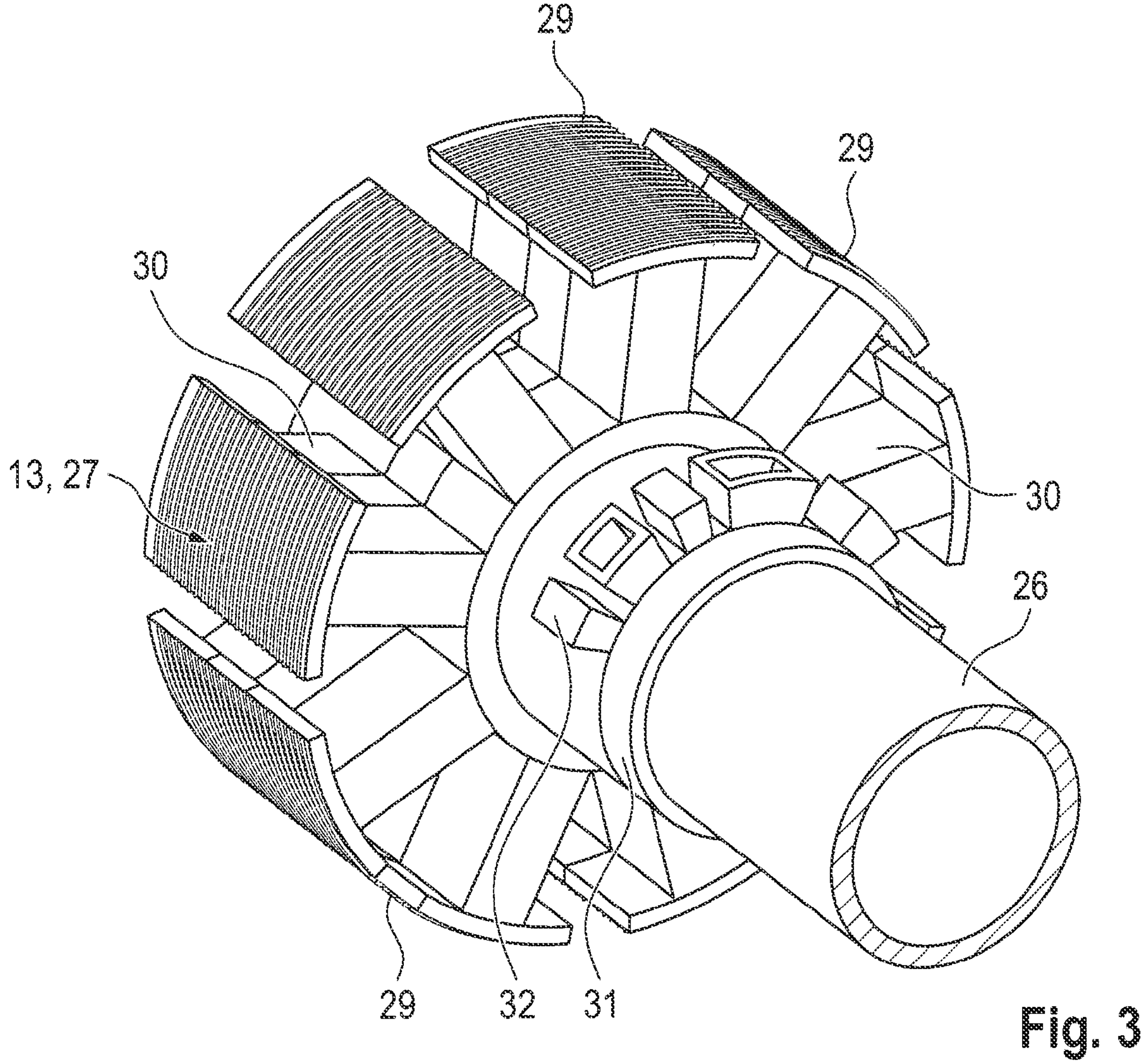
FIG. 3 is a perspective view of a stator base member which is in the form of a lamination bundle of the stator that is placed on the stator carrier which is integrated in one piece without a stator winding.

In FIG. 3, the stator 13 is shown with the stator base member 27, which is disposed on the tubular stator carrier 26 which is secured to the housing, for the stator winding 16. The rotor shaft 12, which is not shown, is guided into the gear mechanism housing 2 by using the bush-like stator carrier 26 which is integrated in the housing portion 22 in one piece or integrally. The stator base member 27 is in the form of an in particular punch-bundled lamination bundle. The stator base member 27, which has a number of stator teeth 29 which are disposed in a star-like manner, is provided with two half-shell-like insulating caps or shells 30. The insulating cap 30 facing the stator carrier 26 has a sleeve-like cap portion 31 through which the stator carrier 26 which is formed on the gear mechanism housing 3 extends. The cap portion 31 serves in particular to provide radial guiding contours 32 for guiding the phase connection wires 25.

In summary, the invention relates to a drive apparatus 1, preferably a window raising mechanism drive, of a motor vehicle having a drive housing, in particular a gear mechanism housing 2, and a brushless electric motor 4 which is disposed in the drive housing and which has a stator 13 having a stator base member 27 which is disposed on a tubular stator carrier 26 which is secured to the housing for a stator winding 16, and having a rotor 15 having a rotor shaft 12 which is guided by using the stator carrier 26 into the drive or gear mechanism housing 2, wherein the stator carrier 26 is integrated in one piece in the drive or gear mechanism housing 2.

The claimed invention is not limited to the exemplary embodiment described above. Instead, other variants of the invention can also be derived therefrom by the person skilled in the art in the context of the disclosed claims without departing from the subject-matter of the claimed invention. In particular, all the individual features described in connection with the different exemplary embodiments in the context of the disclosed claims can also be combined in a different manner without departing from the subject-matter of the claimed invention.

The described solution can also be used not only in the application which is especially illustrated, but also in a similar embodiment for other motor vehicle applications, such as, for example, with door and tailgate systems, in vehicle locks, with adjustable seat and interior systems and with additional electrical drives, control units, sensors and the arrangement thereof in the vehicle.

The following is a summary list of reference numerals and the corresponding structure used in the above description of the invention.

LIST OF REFERENCE NUMERALS

1 Drive apparatus
2 Gear mechanism housing
3 Motor housing
4 Electric motor
5 Flange connection
6 Flange screw
7 Cable drum
8 Worm
9 Connection plug
10 Connection line
11 Connection receiving member
12 Motor/rotor shaft
13 Stator
14 Permanent magnet
15 Rotor
16 Stator/rotary field winding
17 Rotor/housing
18 Bearing location
19 Signal generator/pole wheel
20,21 Bearing
22 Housing shaft
23 Housing cap
24 Electronic compartment
25 Phase connection wire
26 Stator carrier
26*a* First carrier portion
26*b* Second carrier portion
27 Stator base member/lamination bundle
28 Housing space
29 Stator tooth
30 Insulating cap/shell
31 Cap portion
32 Guiding contour
A Axial direction
D Rotation axis
R Radial direction

The invention claimed is:

1. A drive apparatus, electromotive adjustment drive or window raising mechanism drive, of a motor vehicle, the drive apparatus comprising:

a gear mechanism housing and a motor housing, said gear mechanism housing and said motor housing being detachably connected to one another to form a drive housing; and a brushless electric motor disposed in said motor housing, said brushless electric motor having:

a tubular stator carrier secured to said gear mechanism housing, a stator with a stator winding and a stator base member disposed on said tubular stator carrier for said stator winding, and a rotor having a rotor shaft guided by said stator carrier into said gear mechanism housing, said stator carrier being integrated in one piece in said gear mechanism housing;

said gear mechanism housing having a housing portion receiving said rotor shaft, said housing portion having an inner side; and said stator carrier being a tubular or bush-shaped plastic material component injection-molded onto said housing portion, and said stator carrier being injection-molded at said inner side of said housing portion.

2. The drive apparatus according to claim 1, wherein said housing portion has an inner diameter, and said stator carrier has an inner diameter being smaller than said inner diameter of said housing portion axially outside the stator carrier.

3. The drive apparatus according to claim 1, wherein said gear mechanism housing has a housing space receiving said stator and said rotor, and said stator carrier has a carrier portion carrying said stator base member and protruding into said housing space.

4. The drive apparatus according to claim 1, which further comprises a bearing for said rotor shaft, said bearing being received in said stator carrier.

5. The drive apparatus according to claim 1, wherein said stator base member is a lamination bundle.

6. The drive apparatus according to claim 1, which further comprises a flange connection detachably connecting said gear mechanism housing and said motor housing to one another to form a drive housing.

* * * * *